United States Patent [19]

Sakashita et al.

[11] Patent Number: 5,510,450
[45] Date of Patent: *Apr. 23, 1996

[54] METHOD OF PRODUCING COPOLYMERIZED POLYCARBONATES

[75] Inventors: Takeshi Sakashita; Tomoaki Shimoda, both of Iwakuni; Takashi Nagai, Otake, all of Japan

[73] Assignee: General Electric Company, Pittsfield, Mass.

[ * ] Notice: The term of this patent shall not extend beyond the expiration date of Pat. No. 5,502,153.

[21] Appl. No.: 334,702

[22] Filed: Nov. 4, 1994

Related U.S. Application Data

[62] Division of Ser. No. 116,304, Sep. 3, 1993, Pat. No. 5,384,388, which is a continuation of Ser. No. 863,922, Apr. 6, 1992, abandoned.

[30] Foreign Application Priority Data

Feb. 21, 1992 [JP] Japan ..................... 4-35306
Apr. 9, 1992 [JP] Japan ..................... 3-76478

[51] Int. Cl.$^6$ .................................... C08G 64/00
[52] U.S. Cl. .................. 528/199; 528/171; 528/176; 528/179; 528/180; 528/198; 528/200; 528/204
[58] Field of Search ..................... 528/204, 171, 528/176, 179, 180, 198, 199, 200

[56] References Cited

U.S. PATENT DOCUMENTS 3,022,272 2/1962 Schnell et al. .......................... 528/204
3,250,744 5/1966 Schnell et al. .......................... 523/204

FOREIGN PATENT DOCUMENTS 971777 3/1959 Germany .

*Primary Examiner*—James J. Seidleck
*Assistant Examiner*—Terressa Mosley

[57] ABSTRACT

The object of the present invention is to provide a method of producing copolymerized polycarbonates having improved flow and formability, in addition to excellent mechanical properties, heat resistance, transparency, and color tone.

A method of producing copolymerized polycarbonates by melt polycondensation of two or more aromatic dihydroxy compounds with a carbonate diester, characterized in that (i) resorcin and/or substituted resorcins are used as 2–90 mole % of the aromatic dihydroxy compounds, where the sum of all the aromatic dihydroxy compounds is taken as 100 mole %, and (ii) an alkali metal compound and/or an alkaline-earth metal compound (a) is used as the catalyst.

8 Claims, No Drawings

METHOD OF PRODUCING COPOLYMERIZED POLYCARBONATES

This is a divisional of application Ser. No. 08/116,304 filed on Sep. 3, 1993, now U.S. Pat. No. 5,384,388 which is a continuation application of Ser. No. 07/863,922 Apr. 6, 1992, now abandoned.

DETAILED EXPLANATION OF INVENTION

1. Technical Field of Invention

The present invention relates to a method of producing copolymerized polycarbonates, specifically to a method of producing copolymerized polycarbonates having improved formability and flow during forming, in addition to excellent mechanical properties, heat resistance, transparency, and color tone.

2. Technical Background of Invention

Polycarbonates have excellent impact resistance and other mechanical properties as well as good heat resistance, transparency, etc. They are widely used in various types of machine parts, optical disks, automobile parts, etc.

Conventional polycarbonates having such properties are usually produced by interfacial polymerization, in which an aromatic dihydroxy compound such as bisphenol A reacts directly with phosgene. Polycarbonates this type have high glass transition temperatures ($T_g$), and when they are melt formed into optical disks, etc., their fluidity is increased by melting them at high temperatures.

Molded products of polymers in general, and polycarbonates in particular, are more prone to show effects such as impaired transparency and discoloration the longer the material remains in molten form at high temperatures during molding.

Thus, if the melt flow of polycarbonates could be improved, the length of time they are kept in a molten state could be shortened, thus giving molded products which are less affected by heat during forming. The forming characteristics of the polymers would also be improved in other respects, such as shorter molding cycle times and better productivity. Thus there has been a demand for polycarbonates which show even better flow and formability without sacrificing the inherent advantages of polycarbonates such as their mechanical properties, heat resistance, transparency, and color tone.

As a result of determined research by the present inventors seeking to obtain polycarbonates with improved flow and formability without loss of mechanical properties, heat resistance, transparency, or color tone, it has been found that copolymerized polycarbonates formed by melt polycondensation of aromatic dihydroxy compounds containing resorcin and/or substituted resorcins with carbonate diesters show Just such excellent properties. That discovery has led to the present invention.

OBJECT OF INVENTION

The present invention has been developed with the above-mentioned problems of the prior art in mind. Its object is to provide a method of producing copolymerized polycarbonates having improved flow and formability in addition to excellent mechanical properties, heat resistance, transparency, and color tone.

SUMMARY OF INVENTION

The method of producing copolymerized polycarbonates by melt polycondensation of two or more aromatic dihydroxy compounds and a carbonate diester in accordance with the present invention is characterized in that (i) if the total amount of aromatic dihydroxy compounds used is 100 mole %, resorcin and/or substituted resorcins make up 2–90 mole % of that total, and (ii) an alkali metal compound and/or alkaline-earth metal compound (a) is used as the catalyst.

In the method of producing copolymerized polycarbonates in accordance with the present invention, the amount of alkali metal compound and/or alkaline-earth metal compound (a) used is preferably $1\times10^{-8}$ to $1\times10^{-3}$ mole, more preferably $1\times10^{-7}$ to $2.5\times10^{-6}$ mole, per mole of aromatic dihydroxy compounds.

The catalyst used is preferably a combination of (a) an alkali metal compound and/or alkaline-earth metal compound, (b) a nitrogen-containing basic compound, and (c) boric acid or a borate ester.

Also, in the method of producing copolymerized polycarbonates in accordance with the present invention, an acidic compound and optionally an epoxy compound are preferably added to the reaction product obtained by melt polycondensation, which is then subjected to a vacuum treatment.

SPECIFIC EXPLANATION OF INVENTION

The method of producing copolymerized polycarbonates in accordance with the present invention will now be explained in detail.

In accordance with the present invention, copolymerized polycarbonates are produced by melt polycondensation of two or more aromatic dihydroxy compounds with a carbonate diester.

One of the aromatic dihydroxy compounds used is resorcin or a substituted resorcin.

The resorcin and/or substituted resorcins used in the present invention are represented by the following general formula [I].

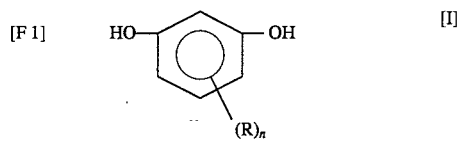

[F 1]    [I]

In the formula [I], each R is a $C_{1-10}$ hydrocarbyl group or halogenated hydrocarbyl group, or a halogen atom. n is an integer from 0 to 4. When n is 2 or more, the various R groups may be the same or different.

Specific examples of such substituted resorcins include 3-methylresorcin, 3-ethylresorcin, 3-propylresorcin, 3-butylresorcin, 3-tert-butylresorcin, 3-phenylresorcin, 3-cumylresorcin, 2,3,4,5-tetrafluororesorcin, 2,3,4,5-tetrabromoresorcin, etc.

These compounds may be used singly or in combinations.

Of the various compounds of this type, resorcin is preferably used.

In the production of copolymerized polycarbonates in accordance with the present invention, if the total amount of aromatic dihydroxy compounds used is 100 mole %, the amount of resorcin and/or substituted resorcins should be 2–90 mole %, preferably 5–70 mole %, more preferably 10–60 mole %, of the total.

The amount of aromatic dihydroxy compounds other than resorcin and/or substituted resorcins used should be 98–10 mole %, preferably 95–30 mole %, more preferably 90–40 mole %.

There is no particular restriction on the aromatic dihydroxy compounds other than resorcin and/or substituted resorcins which may be used; they may be any compound represented by the following general formula [II], or compounds of that general formula [II] in which the phenyl rings are substituted with aliphatic groups and/or halogen atoms.

[F 2] 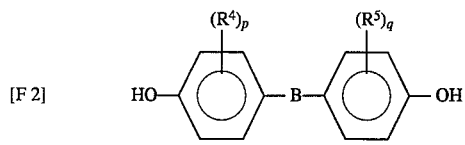

(where B is

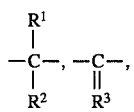

—O—, —S—, —SO— or —SO$_2$—, $R^1$ and $R^2$ are hydrogen atoms or monovalent hydrocarbyl groups, $R^3$ is a divalent hydrocarbylene group, and $R^4$ and $R^5$ are halogen atoms or monovalent hydrocarbyl groups, each of which may be the same as or different from the others, and p and q are both integers from 0 to 4).

Examples of such aromatic dihydroxy compounds include:
bis(4-hydroxyphenyl)methane,
1,1-bis(4-hydroxyphenyl)ethane,
2,2-bis(4-hydroxyphenyl)propane,
2,2-bis(4-hydroxyphenyl)butane,
2,2-bis(4-hydroxyphenyl)octane,
bis(4-hydroxyphenyl)phenylmethane,
2,2-bis(4-hydroxy-1-methylphenyl)propane,
1,1-bis(4-hydroxy-tert-butylphenyl)propane,
2,2-bis(4-hydroxy-3-bromophenyl)propane, and other bis(hydroxy aryl) alkanes,
1,1-bis(4-hydroxyphenyl)cyclopentane,
1,1-bis(4-hydroxyphenyl)cyclohexane, and other bis(hydroxy aryl)cycloalkanes,
4,4'-dihydroxydiphenyl ether,
4,4'-dihydroxy-3,3'-dimethyldiphenyl ether, and other dihydroxy aryl ethers,
4,4'-dihydroxydiphenyl sulfide,
4,4'-dihydroxy-3,3'-dimethyldiphenyl sulfide, and other dihydroxy diaryl sulfides,
4,4'-dihydroxydiphenyl sulfoxide,
4,4'-dihydroxy-3,3'-dimethyldiphenyl sulfoxide, and other dihydroxy diaryl sulfoxides, and
4,4'-dihydroxydiphenyl sulfone,
4,4' -dihydroxy-3,3'-dimethyldiphenyl sulfone, and other dihydroxy diaryl sulfones.

Of the various compounds of this type, 2,2-bis(4-hydroxyphenyl)propane is preferably used.

Specific examples of carbonate diesters which may be used include:
diphenyl carbonate,
ditolyl carbonate,
bis(chlorophenyl) carbonate,
m-cresyl carbonate [sic],
dinaphthyl carbonate,
bis(diphenyl) carbonate,
diethyl carbonate,
dimethyl carbonate,
dibutyl carbonate,
dicyclohexyl carbonate, etc.

Of the various compounds of this type, diphenyl carbonate is preferably used.

These carbonate diesters may also contain up to 50 mole %, preferably not more than 30 mole %, dicarboxylic acids or their derivatives.

Specific examples of dicarboxylic acids or their derivatives include:
dicarboxylic acids, such as terephthalic acid, isophthalic acid, sebacic acid, decanedioic acid, dodecanedioic acid, etc.,
dicarboxylic acid esters, such as diphenyl sebacate, diphenyl terephthalate, diphenyl isophthalate, diphenyl decanedioate, diphenyl dodecanedioate, etc., and
dicarboxylic acid halides, such as terephthaloyl chloride, isophthaloyl chloride, sebacoyl chloride, decanedioyl chloride, dodecanedioyl chloride, etc.

When carbonate diesters containing such dicarboxylic acids or their derivatives are polycondensed with the above-mentioned aromatic dihydroxy compounds, polyester-polycarbonate units are obtained.

In the production of copolymerized polycarbonates in accordance with the present invention, the amount of such carbonate diesters used should be 1.0–1.3 moles, preferably 1.01–1.20 moles, per mole of aromatic dihydroxy compounds.

In addition to the sort of aromatic dihydroxy compounds and carbonate diesters described above, polyfunctional compounds having three or more functional groups per molecule can also be used.

The polyfunctional compounds are preferably compounds having three or more phenolic hydroxyl groups or carboxyl groups. It is particularly preferred to use compounds having three or more phenolic hydroxyl groups. Specific examples include:
1,1,1-tris(4-hydroxyphenyl)ethane,
2,2',2"-tris (4-hydroxyphenyl)diisopropylbenzene,
α-methyl-α,α',α'-tris(4-hydroxyphenyl)-1,4-diethylbenzene,
α,α',α"-tris(4-hydroxyphenyl)-1,3,5-triisopropylbenzene,
fluoroglycin,
4,6-dimethyl-2,4,6-tri(4-hydroxyphenyl)heptane-2,
1,3,5-tri(4-hydroxyphenyl)benzene,
2,2-bis[4,4-(4,4'-dihydroxyphenyl)cyclohexyl]propane,
trimellitic acid,
1,3,5-benzenetricarboxylic acid,
pyromellitic acid, etc.

Preferred among these compounds are 1,1,1-tris( 4-hydroxyphenyl)ethane, α,α',α"-tris(4-hydroxyphenyl) 1,3,5-triisopropylbenzene, etc.

When polyfunctional compounds are used, the amount is usually not more than 0.03 mole, preferably 0.001– 0.02 mole, more preferably 0.001–0.01 mole, per mole of aromatic dihydroxy compounds.

In accordance with the present invention, copolymerized polycarbonates are produced by melt polycondensation of aromatic dihydroxy compounds including resorcin and/or substituted resorcins as described above with carbonate diesters in the presence of a catalyst.

An alkali metal compound and/or an alkaline-earth metal compound (a) is used as the catalyst.

Examples of such an alkali metal compound and/or alkaline-earth metal compound (a) include salts of alkali metals or alkaline-earth metals with organic acids or inorganic acids, as well as alkali metal and alkaline-earth metal oxides, hydroxides, hydrides, alcoholates, etc.

Specifically, alkali metal compounds which may be used include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogen phosphate, dipotassium hydrogen phosphate, dilithium hydrogen phosphate, bisphenol A disodium salt, bisphenol A dipotassium salt, bisphenol A dilithium salt, sodium phenolate, potassium phenolate, lithium phenolate, etc.

Specific alkaline-earth metal salts which may be used include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

These compounds may be used singly or in combinations.

The amount of alkali metal compound and/or alkaline-earth metal compound (a) used is generally not more than ($1\times10^{-2}$ mole), preferably $1\times10^{-8}$ to $1\times10^{-3}$ mole, more preferably $1\times10^{-7}$ to $1\times10^{-5}$ mole, most preferably $1\times10^{-7}$ to $2.5\times10^{-6}$ mole, per mole of aromatic dihydroxy compounds.

If the amount of alkali metal compound and/or alkaline-earth metal compound (a) used is $1\times10^{-8}$ to $1\times10^{-3}$ mole per mole of aromatic dihydroxy compounds, the basicity of those compounds can be weakened or completely neutralized by adding acidic compounds (described below) in amounts which serve to maintain high polymerization activity while not adversely affecting the properties of the resulting copolymerized polycarbonate. In this way one can obtain copolymerized polycarbonates having excellent color tone, heat resistance, water resistance, weather resistance, and stability when kept in a molten state for long periods of time.

The catalyst used in accordance with the present invention may be a combination of an alkali metal compound and/or alkaline-earth metal compound (a), as described above, with a basic compound (b), and/or a borate compound (c).

Examples of such a basic compound (b) include nitrogen compounds which are easily decomposed or volatilized at high temperatures. Specific compounds of this type include the following.

Alkyl, aryl, and/or alkaryl group-containing ammonium hydroxides, such as tetramethylammonium hydroxide (Me$_4$NOH), tetraethylammonium hydroxide (Et$_4$NOH), tetrabutylammonium hydroxide (Bu$_4$NOH), trimethylbenzylammonium hydroxide ($\phi$-CH$_2$(Me)$_3$NOH), etc., tertiary amines, such as trimethylamine, triethylamine, dimethylbenzylamine, triphenylamine, etc., secondary amines represented by R$_2$NH (where R is an alkyl group such as methyl, ethyl, etc., or an aryl group such as phenyl, tolyl, etc.), primary amines represented by RNH$_2$ (where R is as above), imidazoles, such as 2-methylimidazole, 2-phenylimidazole, etc., ammonia, or basic salts such as tetramethylammonium borohydride (Me$_4$NBH$_4$), tetrabutylammonium borohydride (Bu$_4$NBH$_4$), tetrabutylammonium tetraphenylborate (Bu$_4$NBPh$_4$), tetramethylammonium tetraphenylborate (Me$_4$NBPh$_4$), etc.

Of these various compounds, tetraalkyl ammonium hydroxides, in particular electronic-grade tetraalkyl ammonium hydroxides having low impurity metal contents, are preferably used.

Examples of borate compounds (c) include boric acid, and borate esters represented by the following general formula,

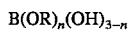

$$B(OR)_n(OH)_{3-n}$$

where R is a methyl, ethyl, or other alkyl group, phenyl or other aryl group, etc., and n is 1, 2, or 3.

Specific borate esters of this type include trimethyl borate, triethyl borate, tributyl borate, trihexyl borate, triheptyl borate, triphenyl borate, tritolyl borate, trinaphthyl borate, etc.

Preferred combinations for use as catalysts in accordance with the present invention include combinations of (a) an alkali metal compound and/or alkaline-earth metal compound, and (b) a nitrogen-containing basic compound.

The alkali metal compound and/or alkaline-earth metal compound (a) should be used in the amount specified above. The amount of the nitrogen-containing basic compound (b) used should be $1\times10^{-6}$ to $1\times10^{-1}$ mole, preferably $1\times10^{-5}$ to $1\times10^{-2}$ mole, per mole of aromatic dihydroxy compounds. If the amount of nitrogen-containing basic compound (b) used is $1\times10^{-6}$ to $1\times10^{-1}$ mole per mole of aromatic dihydroxy compounds, the transesterification and polymerization reactions will proceed at adequate rates, and the resulting copolymerized polycarbonate will have excellent color tone, heat resistance, water resistance, etc.

The use of such a catalyst combination of an alkali metal compound and/or alkaline-earth metal compound (a) and a nitrogen-containing basic compound (b) makes it possible to produce high-molecular-weight copolymerized polycarbonates having excellent transparency, heat resistance, and water resistance, and improved color tone, at high polymerization activities.

In accordance with the present invention it is preferable to use a catalyst combination of (a) an alkali metal compound and/or alkaline-earth metal compound, and (c) boric acid or a borate ester, or a catalyst combination of (a) an alkali metal compound and/or alkaline-earth metal compound, (b) a nitrogen-containing basic compound, and (c) boric acid or a borate ester.

In such a catalyst combination, the alkali metal compound and/or alkaline-earth metal compound (a), and the nitrogen-containing basic compound (b), are preferably used in the amounts specified above.

The amount of boric acid or borate ester (c) used should be $1\times10^{-8}$ to $1\times10^{-1}$ mole, preferably $1\times10^{-7}$ to $1\times10^{-2}$ mole, more preferably $1\times10^{-6}$ to $1\times10^{-4}$ mole, per mole of aromatic dihydroxy compounds.

If the amount of boric acid or borate ester (c) used is $1\times10^{-8}$ to $1\times10^{-1}$ mole per mole of aromatic dihydroxy compounds, one can obtain a copolymerized polycarbonate which does not tend to show lower molecular weight after heat aging, and has excellent color tone, heat resistance, and water resistance.

In particular, the use of catalysts comprising (a) alkali metal compounds and/or alkaline-earth metal compounds, (b) nitrogen-containing basic compounds, and (c) boric acid or borate esters, makes it possible to produce high-molecular-weight copolymerized polycarbonates having excellent transparency, heat resistance, and water resistance, and improved color tone, at high polymerization activities.

Using this sort of catalyst, the polycondensation reaction of the carbonate diester with the aromatic dihydroxy compounds including resorcin and/or substituted resorcins can be carried out under conditions similar to those used in known polycondensation reactions of carbonate diesters with aromatic dihydroxy compounds.

Specifically, the aromatic dihydroxy compounds react with the carbonate diesters at atmospheric pressure and a temperature of 80°–250° C., preferably 100°–230° C., more preferably 120°–190° C., for 0 to 5 hours, preferably 0 to 4 hours, more preferably 0 to 3 hours, after which the pressure in the reaction system is lowered and the temperature increased as the reaction between aromatic dihydroxy compounds and carbonate diesters proceeds, eventually reaching a pressure of less than 5 mm Hg, preferably less than 1 mm Hg, and a temperature of 240°– 320° C., to cause polycondensation of the aromatic dihydroxy compounds with the carbonate diesters.

This polycondensation may be carried out continuously or batchwise, in a tank, tubular, or column reactor.

The copolymerized polycarbonate thus obtained generally has an intrinsic viscosity [η] of 0.2–1.2 dL/g, preferably 0.3–1.0 dL/g.

In accordance with the present invention, copolymerized polycarbonates with high intrinsic viscosities [IV] can be produced even when the proportion of resorcin and/or substituted resorcins in the aromatic dihydroxy compounds used is large.

In the method of producing copolymerized polycarbonates in accordance with the present invention, it is preferred to add an acidic compound and optionally an epoxy compound to the reaction product, i.e. the copolymerized polycarbonate, thus obtained.

The acidic compound may be a Lewis acid, a Broensted acid, or an ester of a sulfur-containing strong acid, so long as it is capable of neutralizing the alkaline compound (alkali metal compound, alkaline-earth metal compound, etc.) used as the catalyst.

A Broensted acid used for this purpose should have a $pK_a$ of less than 5, preferably less than 3, in aqueous solution at 25° C.

Using an acidic compound having such a $pK_a$ value is advantageous because it can neutralize the alkali metal or alkaline-earth metal used as the catalyst, and thus stabilize the resulting copolymerized polycarbonate.

Specific examples of Lewis acids include:

boron compounds, such as zinc borate, boron phosphate, etc., borate esters, such as $B(OCH_3)_3$, $B(OEt)_3$, $B(OPh)_3$, etc., aluminum compounds, such as aluminum stearate, aluminum silicate, etc., zirconium compounds, such as zirconium carbonate, zirconium alkoxides, zirconium hydroxycarboxylates, etc., gallium compounds, such as gallium phosphide, gallium antimonide, etc., germanium compounds, such as germanium oxide, organic germanium compounds, etc., tin compounds, such as tetra- and hexaorganotin compounds, $PhOSn(Bu)_2OSn(Bu)_2OPh$, etc., antimony compounds, such as antimony oxide, alkyl antimony compounds, etc., bismuth compounds, such as bismuth oxide, alkyl bismuth compounds, etc., zinc compounds, such as $(CH_3COO)_2Zn$, zinc stearate, etc., and titanium compounds, such as alkoxy titanium compounds, titanium oxide, etc.

(In the formulas above, Ph represents a phenyl group, Et an ethyl group, and Bu a butyl group.)

Specific examples of Broensted acids include:

phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, asparaginic acid, benzoic acid, formic acid, acetic acid, citric acid, glutamic acid, salicylic acid, nicotinic acid, fumaric acid, maleic acid, oxalic acid, benzenesulfinic acid, toluenesulfinic acid, benzenesulfonic acid, p-toluenesulfonic acid, trifluoromethanesulfonic acid, naphthalenesulfonic acid, sulfonated polystyrene, methyl acrylatesulfonated styrene copolymers, other sulfonic acids, etc.

Esters of sulfur-containing acids which may be used include dimethyl sulfate, diethyl sulfate, methyl, ethyl, butyl, octyl, or phenyl esters of p-toluenesulfonic acid, methyl, ethyl, butyl, or octyl esters of benzenesulfonic acid, and other such compounds whose acid groups have a $pK_a$ of less than 3.

Of these various acidic compounds, those containing sulfur, phosphorus, etc. are preferred. Acidic compounds containing sulfur are particularly preferred.

The acidic compounds are added to the reaction product in amounts sufficient to neutralize or weaken the effect of residual alkaline compounds on the copolymerized polycarbonate. The amount could be, for example, 0.01–500 moles, preferably 0.1–100 moles, more preferably 0.1–50 moles, most preferably 0.5–30 moles, per mole of residual alkali metal compound and/or alkaline-earth metal compound in the copolymerized polycarbonate.

In particular when the acidic compound is a Lewis acid or a Broensted acid with a $pK_a$ greater than 3, the amount used should be 0.01–500 moles, preferably 0.1–50 moles, more preferably 0.1–30 moles. If the acidic compound is a Broensted acid with a $pK_a$ of 3 or less, or an ester of a sulfur-containing acid, the amount used should be 0.01–500 moles, preferably 0.1–15 moles, more preferably 0.1–7 moles.

Epoxy compounds which may be used in accordance with the present invention are compounds having one or more epoxy groups per molecule. There is no particular restriction on the amount used, although it is generally 0.0001–0.2 wt. part, preferably 0.001–0.1 wt. part, per 100 wt. parts of copolymerized polycarbonate in the reaction product.

Specific examples of such epoxy compounds include epoxidized soybean oil, epoxidized linseed oil, phenyl glycidyl ether, allyl glycidyl ether, tert-butylphenyl glycidyl ether, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, 2,3-epoxycyclohexylmethyl 3,4-epoxycyclohexanecarboxylate, 4-(3,4-epoxy-5-methylcyclohexyl)butyl 3,4-epoxycyclohexanecarboxylate, 3,4-epoxycyclohexylethylene oxide, cyclohexylmethyl 3,4-epoxycyclohexanecarboxylate, 3,4-epoxy-6-methylcyclohexylmethyl 6-methylcyclohexanecarboxylate, bisphenol A diglycidyl ether, tetrabromobisphenol A glycidyl ether, phthalic acid diglycidyl ester, hexahydrophthalic acid diglycidyl ester, bisepoxycyclopentadienyl ether, bis-epoxyethylene glycol, bis-epoxycyclohexyl adipate, butadiene diepoxide, tetraphenylethylene epoxide, octyl epoxytalate [sic], epoxidized polybutadiene, 3,4-dimethyl-1,2-epoxycyclohexane, 3,5-dimethyl-1,2-epoxycyclohexane, 3-methyl-5-tert-butyl-1,2-epoxycyclohexane, octadecyl 2,2'-dimethyl-3,4-epoxycyclohexanecarboxylate, n-butyl 2,2'-dimethyl-3,4-epoxycyclohexanecarboxylate, cyclohexyl 2-methyl- 3,4-epoxycyclohexanecarboxylate, n-butyl 2-isopropyl- 3,4-epoxy-5-methylcyclohexanecarboxylate, octadecyl 3,4-epoxycyclohexanecarboxylate, 2-ethylhexyl 3',4'-epoxycyclohexanecarboxylate, 4,6-dimethyl-2,3-epoxycyclohexyl 3',4'-epoxycyclohexanecarboxylate, 4,5-epoxytetrahydrophthalic anhydride, 3-tert-butyl- 4,5-epoxytetrahydrophthalic anhydride, diethyl 4,5-epoxy-cis-1,2-cyclohexanedicarboxylate, di-n-butyl- 3-tert-butyl 4,5-epoxy-cis-1,2-cyclohexanedicarboxylate, etc. These compounds may be used singly or in combinations of two or more.

When acidic and epoxy compounds are added at the same time to the copolymerized polycarbonate reaction product, any excess acidic compound is neutralized by reaction with the epoxy compound, and one thus obtains a copolymerized polycarbonate having excellent color tone, heat resistance, water resistance, etc.

In the method of producing copolymerized polycarbonates in accordance with the present invention, there is no particular restriction on the technique used to add the acidic compound and optionally an epoxy compound to the polycarbonate obtained as the reaction product. For example, the acidic compound and optionally an epoxy compound may be added to the copolymerized polycarbonate in the molten state and kneaded with it, or the acidic compound and optionally an epoxy compound may be added to a solution of the copolymerized polycarbonate and stirred.

Once the polycondensation reaction is complete, the acidic and epoxy compounds may be added to the molten copolymerized polycarbonate reaction product either simultaneously or one after the other, either in the reactor or in an extruder, and then kneaded. It is also possible to pelletize the copolymerized polycarbonate, and then feed the acidic compound and optionally an epoxy compound along with the pellets to a single-screw or twin-screw extruder to melt knead them with the polymer. Another method is to dissolve the copolymerized polycarbonate in a suitable solvent, such as methylene chloride, chloroform, toluene, tetrahydrofuran, etc., to prepare a solution, and then add the acidic compound and optionally an epoxy compound to the solution, either simultaneously or one after the other, and stir.

When an acidic compound and an epoxy compound are added separately to the copolymerized polycarbonate, either the acidic compound or the epoxy compound may be added first.

In addition to such acidic compounds and epoxy compounds, it is also possible in accordance with the present invention to add the usual heat stabilizers, Tinuvin ultraviolet absorbers, mold release agents, antistatic agents, slip agents, antiblocking agents, lubricants, antifogging agents, dyes, pigments, natural oils, synthetic oils, waxes, organic fillers, inorganic fillers, etc. to the copolymerized polycarbonate in amounts which do not interfere with the object of the present invention.

Specific examples of such heat stabilizers include phenolic stabilizers, organic thio ether stabilizers, organic phosphite stabilizers, hindered amine stabilizers, and epoxy stabilizers.

Phenolic stabilizers include, for example, n-octadecyl 3-(4-hydroxy-3',5'-di-tert-butylphenyl)propionate, tetrakis[methylene-3-(3',5'-di-tert-butyl-4-hydroxyphenyl)propionato] methane, 1,1,3-tris(2-methyl-4-hydroxy- 5- tert-butylphenyl)butane, distearyl (4-hydroxy- 3-methyl-5-tert-butyl)benzylmalonate, 4-hydroxymethyl- 2,6-di-tert-butylphenol, etc. These may be used singly or in combinations of two or more.

Thio ether stabilizers include, for example, dilauryl thiodipropionate, distearyl thiodipropionate, dimyristyl 3,3'-thiodipropionate, ditridecyl 3,3'-thiodipropionate, pentaerythritol tetrakis(β-laurylthiopropionate), etc. These may be used singly or in combinations of two or more.

Phosphorus-containing stabilizers include, for example:

aryl alkyl phosphites such as bis(2,4-di-tert-butylphenyl) pentaerythrityl diphosphite, diphenyl decyl phosphite, diphenyl isooctyl phosphite, phenyl isooctyl phosphite, 2-ethylhexyl diphenyl phosphite, etc., trialkyl phosphites such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, tris(2-chloroethyl) phosphite, tris(2,3-dichloropropyl) phosphite, etc., tricycloalkyl phosphites such as tricyclohexyl phosphite, etc., triaryl phosphites such as triphenyl phosphite, tricresyl phosphite, tris(ethylphenyl) phosphite, tris( 2,4-di-tert-butylphenyl) phosphite, tris(nonylphenyl) phosphite, tris(hydroxyphenyl) phosphite, etc., trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, tris(2,3-dichloropropyl) phosphate, etc., tricycloalkyl phosphates such as tricyclohexyl phosphate, etc., and triaryl phosphates such as triphenyl phosphate, tricresyl phosphate, tris(nonylphenyl) phosphate, 2'-ethylphenyl diphenyl phosphate, etc. These may be used singly or in combinations of two or more.

Hindered amine stabilizers include, for example, bis(2,2,6,6-tetramethyl-4-piperidinyl) sebacate, bis( 1,2,2,6,6-pentamethyl-4-piperidinyl) sebacate, 1-[2-{3-(3,5-di-tert-butyl-4-hydroxyphenyl)propionyloxy} ethyl]-4-{3-(3,5-di-tert-butyl-4-hydroxyphenyl)propionyloxy} -2,2,6,6-tetramethylpiperidine, 8-benzyl- 7,7,9,9-tetramethyl-3-octyl-1,2,3-triazaspiro[4,5]undecan- 2,4-dione, 4-benzoyloxy-2,2,6,6-tetramethylpiperidine, bis(1,2,2,6,6-pentamethyl-4-piperidinyl) 2-(3,5-di-tert-butyl-4-hydroxybenzyl)-2-n-butylmalonate, tetrakis(2,2,6,6-tetramethyl-4-piperidinyl) 1,2,3,4-butanetetracarboxylate, etc. These may be used singly or in combinations of two or more.

The amount of such heat stabilizers used should generally be 0.001–5 wt. parts, preferably 0.005–0.5 wt. part, more preferably 0.0–0.3 wt. part, per 100 wt. parts of the copolymerized polycarbonate.

These heat stabilizers may be added either in solid or liquid form.

In order to reduce the number of times the copolymerized polycarbonate has to be reheated, these heat stabilizers are preferably added while the copolymerized polycarbonate Is still in molten form, anywhere from the final polymerization reactor to the point at which the product is cooled and pelletized. Because the copolymerized polycarbonate contains heat stabilizers, thermal decomposition of the polymer will be inhibited during subsequent reheating and processing, such as extrusion or pelletizing operations.

One can also add ultraviolet absorbers at the same time as the heat stabilizers. There is no particular restriction on the type of ultraviolet absorber used. It may be any of the common ultraviolet absorbers, such as a salicylate ultraviolet absorber, a benzophenone ultraviolet absorber, a benzotriazole ultraviolet absorber, a cyanoacrylate ultraviolet absorber, etc.

Specific examples of salicylate ultraviolet absorbers include phenyl salicylate, p-tert-butylphenyl salicylate, etc.

Benzophenone ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, 2-hydroxy-4-methoxybenzophenone-5-sulfonic acid, etc.

Examples of benzotriazole ultraviolet absorbers include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3',4',5',6'-tetrahydrophthalimidomethyl)-5'-methylphenyl]benzotriazole, 2,2'-methylenebis[4-(1,1,3,3-tetramethylbutyl)- 6-(2H-benzotriazol-2-yl)phenol], etc.

Cyanoacrylate ultraviolet absorbers include 2-ethylhexyl 2-cyano-3,3-diphenylacrylate, ethyl 2-cyano 3,3-diphenylacrylate, etc. They may be used singly or in combinations of two or more.

The amount of ultraviolet absorbers used is ordinarily 0.001–5 wt. parts, preferably 0.005–1 wt. part, more preferably 0.01–0.5 wt. part, per 100 wt. parts of the copolymerized polycarbonate.

In accordance with the present invention, mold release agents may also be added at the same time as the heat stabilizers described above. There is no particular restriction on the type of mold release agent used; it may be any of the common mold release agents. Examples include:

- hydrocarbon mold release agents, such as natural and synthetic paraffins, polyethylene waxes, fluorocarbons, etc.,
- fatty acid mold release agents, such as stearic acid, hydroxystearic acid, other higher fatty acids, hydroxy fatty acids, etc.,
- fatty amide mold release agents, such as stearamide, ethylenebisstearamide, other alkylene bis fatty amides, etc.,
- alcohol mold release agents, such as stearyl alcohol, cetyl alcohol, other fatty alcohols, polyhydric alcohols, polyglycole, polyglycerols, etc.
- fatty acid ester mold release agents, such as butyl stearate, pentaerythritol tetrastearate, other fatty acid esters of lower alcohols, fatty acid esters of polyhydric alcohols, fatty acid eaters of polyglycols, etc., and
- silicone mold release agents, such as silicone oils, etc.

These agents may be used singly or in combinations of two or more. The amount of mold release agent used is ordinarily 0.001-wt. parts, preferably 0.005–1 wt. part, more preferably 0.01–0.5 wt. part, per 100 wt. parts of the polycarbonate.

Colorants can also be added at the same time as the heat stabilizers discussed above. The colorants may be either pigments or dyes. Inorganic or organic colorants, or combinations of both types, can be used.

Specific examples of inorganic colorants include oxides such as titanium dioxide and iron oxide red, hydroxides such as alumina white, sulfides such as zinc sulfide, selenides, ferrocyanides such as Prussian Blue, chromate salts such as zinc chromate and Molybden Red, sulfate salts such as barium sulfate, carbonate salts such as calcium carbonate, silicate salts such as ultramarine, phosphate salts such as Manganese Violet, carbon in forms such as carbon black, metal powder pigments such as bronze powder and aluminum powder, etc.

Specific examples of organic colorants include nitroso compounds such as Naphthol Green B, nitro compounds such as Naphthol Yellow S, azo compounds such as Resol Red, Bordeaux 10B, Naphthol Red, and Cromophthal Yellow, phthalocyanine compounds such as Phthalocyanine Blue and Fast Sky Blue, and condensed polycyclic colorants such as Indanthrone Blue, Quinacridone Violet, and Dioxazine Violet, etc.

These colorants may be used singly or in combinations of two or more.

The amount of such colorants used is ordinarily $1 \times 10^{-6}$ to 5 wt. parts, preferably $1 \times 10^{-5}$ to 3 wt. parts, more preferably $1 \times 10^{-5}$ to 1 wt. part, per 100 wt. parts of the copolymerized polycarbonate.

In accordance with the present invention, the copolymerized polycarbonate obtained by the polycondensation reaction is preferably subjected to a vacuum treatment following the addition of the acidic compound and optionally an epoxy compound.

There is no particular restriction on the apparatus used for such vacuum treatment. For example, one may use a reactor having a vacuum apparatus attached to it, or an extruder with a vacuum apparatus attached.

When a reactor is used, it may be a vertical tank reactor or a horizontal tank reactor, although horizontal tank reactors are preferred.

Vacuum treatment in such a reactor is performed at a pressure of 0.05–750 mm Hg, preferably 0.05–5 mm Hg.

If vacuum treatment is carried out using an extruder, it is preferably performed for a period of approximately 10 seconds to 15 minutes. In a reactor, on the other hand, the treatment time is preferably from about 5 minutes to 3 hours. Vacuum treatment is preferably performed at a temperature of approximately 240°– 350° C.

When vacuum treatment is carried out using an extruder, either a vented single-screw extruder or a vented twin-screw extruder may be used. The polymer can also be pelletized at the same time.

When vacuum treatment Is carried out in an extruder, it can be performed at a pressure of 1–750 mm Hg, preferably 5–700 mm Hg.

Thus, by adding an acidic compound and optionally an epoxy compound to the copolymerized polycarbonate reaction product, then subjecting it to vacuum treatment, one can obtain a copolymerized polycarbonate having lower residual monomer and oligomer contents, In copolymerized polycarbonates obtained in this way, the constituent units derived from resorcin and/or substituted resorcins are represented by the following formula [III], while the constituent units formed from aromatic dihydroxy compounds other than resorcin and/or substituted resorcins are represented by the general formula [IV],

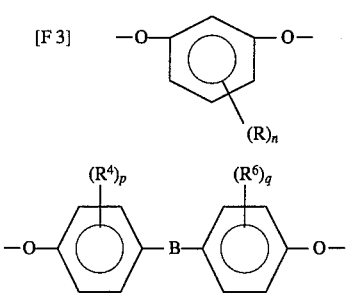

$$[\text{III}]$$

$$[\text{IV}]$$

R and n in formula [III] are as in formula [I] above, and $R^4, R^5$, p, and q in formula [IV] are as in formula [III] above.

Copolymerized polycarbonates obtained in accordance with the present invention contain 2–90 mole %, preferably 5–70 mole %, more preferably 10–60 mole %, constituent units derived from resorcin and/or substituted resorcins, where the total of all constituent units derived from aromatic dihydroxy compounds is taken as 100 mole %. Constituent units derived from aromatic dihydroxy compounds other than resorcin and/or substituted resorcins make up 98–10 mole %, preferably 95–30 mole %, more preferably 90–40 mole %, of the total.

Such copolymerized polycarbonates contain a random distribution of constituent units derived from the resorcin and/or substituted resorcins and carbonate diesters, and constituent units derived from the other aromatic dihydroxy compounds and carbonate diesters.

Copolymerized polycarbonates obtained in accordance with the present invention may also contain polyester-polycarbonate units of the type mentioned above, in amounts which do not interfere with the object of the present invention. Specifically, they may contain up to 50 mole %, preferably not more than 30 mole %, polyester-polycarbonate units.

Copolymerized polycarbonates obtained in accordance with the present invention may also contain constituent units derived from the sort of polyfunctional compounds described above, in amounts which do not interfere with the object of the present invention. Specifically, there may be up to 0.03 mole of such units, preferably 0.001–0.02 mole, more preferably 0.001–0.01 mole, of such units per mole of copolymerized polycarbonate.

Copolymerized polycarbonates obtained in accordance with the present invention usually have glass transition temperatures ($T_g$) of 100°–150° C., preferably 110°–135° C.

Their thermal decomposition temperatures are usually 350°–380° C., preferably 360°–380° C.

They usually have melt flow rates (MFR) (measured by the JIS K 7210 standard method, at a temperature of 280° C. and a load of 1.2 kg) of 5–30 g/10 min, preferably 8–20 g/10 min.

Copolymerized polycarbonates obtained in accordance with the present invention have excellent melt flow and formability, in addition to good mechanical properties, heat resistance, transparency, and color tone. Because such copolymerized polycarbonates can be fabricated using shorter melt processing times, they can be used to make copolymerized polycarbonate products with excellent properties which show little or no effects from the heat used in fabricating them, in addition to the advantages of shorter molding cycle times and better productivity.

The higher the proportion of constituent units derived from resorcin and/or substituted resorcins, the better the sliding characteristics of the copolymerized polycarbonates. On the other hand, if the proportion of such units is lower, the water resistance of the polymer is better, as is its stability during prolonged holdup in melt forming operations.

Copolymerized polycarbonates in accordance with the present invention also give molded products which show excellent weather resistance and color stability during prolonged use, so they are well suited for use in optical applications such as sheets, lenses, compact disks, etc., automobile parts and other outdoor applications, as well as applications such as instrument housings, etc.

Copolymerized polycarbonates obtained in accordance with the present invention not only have thermal decomposition temperatures as high as those of ordinary polycarbonates, but also show good chemical resistance, including to gasoline. They are thus suitable for molding into automobile engine parts.

Some impairment of transparency or color tone may occur if aromatic dihydroxy compounds including resorcin and/or substituted resorcins are made to react directly with phosgene to obtain a copolymerized polycarbonate having constituent units derived from resorcin and/or substituted resorcins. In such an interfacial polymerization process, it also tends to be difficult to obtain copolymerized polycarbonates having high intrinsic viscosity [IV] if the aromatic dihydroxy compounds include a high proportion of resorcin and/or substituted resorcins.

EFFECT OF INVENTION

The method of producing copolymerized polycarbonates in accordance with the present invention can be used to make copolymers containing 2–90 mole % constituent units derived from resorcin and/or substituted resorcins. Copolymerized polycarbonates obtained by this method have improved flow and formability in addition to excellent mechanical properties, heat resistance, chemical resistance, transparency, and color tone.

In the method of the present invention, if the copolymerized polycarbonate reaction product is also treated with acidic compounds and optionally epoxy compounds, the effect of residual alkaline compound catalysts in the product is neutralized or weakened, and the epoxy compounds serve to diminish any adverse effects of the acidic compounds. Thus, the method of the present invention makes it possible to suppress adverse effects of the catalyst, and produce copolymerized polycarbonates having excellent heat resistance, water resistance, and weather resistance, as well as good stability when held for long periods of time in the molten state.

The present invention will now be explained by means of some examples, although it is by no means limited to the examples described here.

EXAMPLES

The following test methods were used for property measurements:

Intrinsic Viscosity (IV) [dL/g]: measured with an Ube-rode viscometer, in methylene chloride solution at 20° C.

Melt Flow Rate (MFR) [g/10 min]: measured by the JIS K-7210 standard method, at 300° C. with a load of 1.2 kg Color Tone (YI): Test plates 3 mm thick were formed by injection molding at cylinder temperature 290° C., injection pressure 1000 kg/cm², cycle time 45 sec, and mold temperature 100° C. The X, Y and Z values for each plate were measured by the transmission method using a Color and Color Difference Meter ND-1001 DP (from Nippon Denshoku Kogyo). The yellowness index (YI) was obtained from the measured values as follows.

$$YI=100(1.277X-1.060Z)/Y$$

Light Transmission: measured by the ASTM D 1003 standard method, using the same injection-molded test plates as in the color tone measurements Haze: measured with an NDH-200 meter (from Nippon Denshoku Kogyo) using the same injection-molded test plates as in the color tone measurements Holdup Stability: The resin was injection molded after being held up in the molding machine at a cylinder temperature of 320° C. for 15 minutes, and the YI and MFR of the resulting test plates were measured.

Example 1

A charge of 0.300 mole of bisphenol A (from Nihon GE Plastics Ltd.), 0.300 mole of resorcin (from Mitsui Sekiyu Kagaku Kogyo Ltd.), and 0.672 mole diphenyl carbonate (from Enii Co.) was placed in a 500-mL glass reactor, blanketed with nitrogen, and heated to 180° C. with stirring by a nickel agitator for 30 minutes. Then 91.2 mg of a 15% aqueous solution of tetramethylammonium hydroxide ($2.5 \times 10^{-4}$ mole/mole bisphenol A) and 19.2 mg of a 0.1% aqueous solution of sodium hydroxide ($0.004 \times 2.5 \times 10^{-4}$ mole/mole bisphenol A) were added, and the contents stirred for 30 minutes to effect transesterification.

Then the temperature in the reactor was raised to 210° C. as the pressure was gradually lowered to 200 mm Hg and held at that value for 1 hour, after which the temperature was raised to 240° C. (still at 200 mm Hg) for 20 minutes, then the pressure was gradually lowered to 150 mm Hg and held for 20 minutes, then to 100 mm Hg for 20 minutes, and to 15 mm Hg for 0.5 hour, then the temperature was raised to 270° C. and the pressure lowered to 0.5 mm Hg, and the reaction allowed to continue for 2 hours.

After 2 hours the reactor was again blanketed with nitrogen, 5.472 mg of a 5% toluene solution of butyl p-toluenesulfonate ($0.008 \times 2.5 \times 10^{-4}$ mole/mole bisphenol A) was added, and the reactor contents were stirred for 30 minutes at 0.5 mm Hg, then formed into pellets.

The resulting copolymerized polycarbonate had an intrinsic viscosity (IV) of 0.49 dL/g.

The results are listed in Table 1.

Example 2

The procedure in Example I was repeated using 0.450 mole of bisphenol A (from Nihon GE Plastics Ltd.) and 0.150 mole of resorcin (from Mitsui Sekiyu Kagaku Kogyo Ltd.), to obtain copolymerized polycarbonate pellets. The results are listed in Table 1.

Example 3

A charge of 0.300 mole of bisphenol A (from Nihon GE Plastics Ltd.), 0.300 mole of resorcin (from Mitsui Sekiyu Kagaku Kogyo Ltd.), 0.672 mole diphenyl carbonate (from Enii Co.), and 3.0 mg of a 3% aqueous solution of boric acid ($0.1 \times 2.5 \times 10^{-4}$ mole/mole bisphenol A) was placed in a 500-mL glass reactor, blanketed with nitrogen, and heated to 180° C. with stirring by a nickel agitator for 30 minutes. Then 91.2 mg of a 15% aqueous solution of tetramethylammonium hydroxide ($2.5 \times 10^{-4}$ mole/mole bisphenol A) and 19.2 mg of a 0.1% aqueous solution of sodium hydroxide ($0.004 \times 2.5 \times 10^{-4}$ mole/mole bisphenol A) were added, and the contents stirred for 30 minutes to effect transesterification.

Then the temperature in the reactor was raised to 210° C. as the pressure was gradually lowered to 200 mm Hg and held at that value for 1 hour, after which the temperature was raised to 240° C. (still at 200 mm Hg) for 20 minutes, then the pressure was gradually lowered to 150 mm Hg and held for 20 minutes, then to 100 mm Hg for 20 minutes, and to 15 mm Hg for 0.5 hour, then the temperature was raised to 270° C. and the pressure lowered to 0.5 mm Hg, and the reaction allowed to continue for 2 hours.

The resulting copolymerized polycarbonate had an intrinsic viscosity (IV) of 0.48 dL/g. The results are listed in Table 1.

Examples 4–8

The procedure in Example 1 was repeated, except that after polymerization the compounds listed in Table 1 were added as stabilizers in the amounts indicated, and kneaded with the copolymerized polycarbonates before they were formed into pellets. The results are listed in Table 1.

Comparison 1

The procedure in Example 1 was repeated using 0.600 mole of bisphenol A (from Nihon GE Plastics Ltd.) and no resorcin, to obtain a polycarbonate.

The results are shown in Table 1.

Comparison 2

The procedure in Comparison 1 was repeated using the type and amount of heat stabilizer listed in Table 1, to obtain a polycarbonate.

The results are listed in Table 1.

Comparison 3

The properties of a bisphenol A polycarbonate (Lexan LS2-111, from Nihon GE Plastics Ltd.) were measured.

The results are listed in Table 1.

Examples 9–10

The procedure in Example 1 was repeated using the amounts of bisphenol A and resorcin listed in Table 1, with a total polymerization time of 1.5 hours, and with addition of the stabilizers indicated in the table, to obtain copolymerized polycarbonate pellets. The results are listed in Table 1.

Example 11

The procedure in Example 1 was repeated, except that 240 mg of a 10% aqueous solution of sodium hydroxide ($5 \times 2.5 \times 10^{-4}$ mole/mole bisphenol A) was added, the pressure was ultimately lowered to 0.5 mm Hg, and the reaction was allowed to go on for 1 hour, to obtain copolymerized polycarbonate pellets.

Comparison 4

The procedure in Example 1 was repeated, using the amount of bisphenol A indicated in Table 1, and a total polymerization time of 1.5 hours. The compounds listed in the table were added as stabilizers after polymerization, and kneaded with the reaction product, to form copolymerized polycarbonate pellets. The results are listed in Table 1.

Comparison 5

The properties of a bisphenol A polycarbonate (High Flow Grade, from Nihon GE Plastics Ltd.) were measured.

The results are listed in Table 1.

Comparison 6

A mixture of 0.5 mole of bisphenol A, 0.5 mole of resorcin, 114 g of sodium hydroxide, 1300 mL of water, and 1620 mL of methylene chloride was charged to a 5-liter polymerization flask, then 96 g of NaOH, 1820 mL of water, and 114 mg of triethylbenzylammonium bromide were added, and the flask contents were stirred at 1200 rpm at 25° C. as phosgene was bubbled in, and the pH of the reaction mixture was adjusted to 11 as the reaction continued for 2 hours.

A precipitate was observed to form during the reaction. After completion of the reaction, the polymerization flask was purged with nitrogen for 15 minutes to remove any remaining phosgene. The methylene chloride layer containing the precipitate was recovered in a separatory funnel, adjusted to pH 1 with concentrated hydrochloric acid, and then washed with water until it became neutral. The resulting methylene chloride solution was poured into 20 liters of methanol to precipitate the polymer.

The polymer had an IV of only 0.30 dL/g. Its other properties could not be measured.

The stabilizers used, as indicated in Table 1, were the following:

Irganox 168, from Ciba-Geigy

Mark A0-50, from Adeka-Argus

Cyasorb UV-5411, from Sun Chemical

TSF 437, from Toshiba Silicone

Plast Violet 8840, from Bayer

TABLE 1

| | Example 1 | Example 2 | Example 3 | Example 4 | Example 5 |
|---|---|---|---|---|---|
| Bisphenol A/Resorcin (mole ratio in feed) | 50/50 | 75/25 | 50/50 | 50/50 | 75/25 |
| Acidic Compound Added | Butyl p-toluene-sulfonate | Butyl p-toluene-sulfonate | — | Butyl p-toluene-sulfanate | Butyl p-toluene-sulfonate |
| (moles/mole alkali metal) | 2 | 2 | — | 2 | 2 |
| Epoxy Compound Celloxide 2021P (Daicel) (g/100 g polymer) | 0 | 0 | 0 | 0.05 | 0.05 |
| Additives (g/100 g polymer) | | | | | |
| Irganox 168 (Ciba-Geigy) | 0 | 0 | 0 | 0.05 | 0.05 |
| Mark A0-50 (Adeka-Argus) | 0 | 0 | 0 | 0.05 | 0.05 |
| Cyasorb UV-5411 (Sun Chem) | 0 | 0 | 0 | 0.3 | 0.3 |
| TSF 437 (Toshiba Silicone) | 0 | 0 | 0 | 0.3 | 0.3 |
| Plast Violet 8840 (Bayer) | 0 | 0 | 0 | 0.00006 | 0.00006 |
| Initial Properties | | | | | |
| Intrinsic Viscosity (dL/g) | 0.49 | 0.49 | 0.48 | 0.49 | 0.49 |
| MFR (g/10 min) | 20 | 15 | 21 | 21 | 16 |
| Color Tone (YI) | 2.1 | 2.0 | 2.0 | 0.7 | 0.6 |
| Light Transmission (%) | 90.8 | 90.8 | 90.6 | 89.6 | 89.6 |
| Haze | 0.4 | 0.3 | 0.4 | 0.4 | 0.3 |
| Holdup Stability | | | | | |
| MFR (g/10 min) | 23 | 17 | 26 | 25 | 18 |
| MFR Increase (%) | 15 | 10 | 20 | 20 | 15 |
| Color Tone (YI) | 2.4 | 2.3 | 2.4 | 1.0 | 0.9 |
| Light Transmission (%) | 90.7 | 90.7 | 90.4 | 89.6 | 89.6 |
| Heat Resistance HDT (°C.) | 111 | 123 | 110 | 111 | 123 |
| Heat Aging Resistance Color Tone (YI) | 44 | 37 | 52 | 28 | 13 |
| Water Resistance Haze | 51 | 2 | 54 | 61 | 4 |

| | Example 6 | Example 7 | Example 8 | Example 9 | Example 10 | Example 11 |
|---|---|---|---|---|---|---|
| Bisphenol A/Resorcin (mole ratio in feed) | 85/15 | 90/10 | 85/15 | 85/15 | 90/10 | 50/50 |
| Acidic Compound Added | Butyl p-toluene-sulfonate | Butyl p-toluene-sulfonate | Butyl p-toluene-sulfonate | Butyl p-toluene-sulfonate | Butyl p-toluene-sulfonate | Butyl p-toluene-sulfonate |
| (moles/mole alkali metal) | 2 | 2 | 2 | 2 | 2 | 2 |
| Epoxy Compound Celloxide 2021P (Daicel) (g/100 g polymer) | 0 | 0 | 0.05 | 0.05 | 0.05 | 0.05 |
| Additives (g/100 g polymer) | | | | | | |
| Irganox 168 (Ciba-Geigy) | 0 | 0 | 0.05 | 0.05 | 0.05 | 0.05 |
| Mark A0-50 (Adeka-Argus) | 0 | 0 | 0.05 | 0.05 | 0.05 | 0.05 |
| Cyasorb UV-5411 (Sun Chem) | 0 | 0 | 0.3 | 0.3 | 0.3 | 0.3 |
| TSF 437 (Toshiba Silicone) | 0 | 0 | 0.3 | 0.3 | 0.3 | 0.3 |
| Plast Violet 8840 (Bayer) | 0 | 0 | 0.00006 | 0.00006 | 0.00006 | 0.00006 |
| Initial Properties | | | | | | |
| Intrinsic Viscosity (dL/g) | 0.49 | 0.49 | 0.49 | 0.42 | 0.42 | 0.49 |

TABLE 1-continued

| | | | | | | |
|---|---|---|---|---|---|---|
| MFR (g/10 min) | 13 | 12 | 14 | 37 | 32 | 21 |
| Color Tone (YI) | 1.9 | 1.8 | 0.6 | 0.6 | 0.6 | 4.1 |
| Light Transmission (%) | 90.8 | 90.8 | 89.7 | 89.7 | 89.7 | 90.5 |
| Haze | 0.4 | 0.3 | 0.3 | 0.3 | 0.3 | 0.4 |
| Holdup Stability | | | | | | |
| MFR (g/10 min) | 14 | 13 | 15 | 41 | 35 | 27 |
| MFR Increase (%) | 10 | 10 | 10 | 10 | 10 | 30 |
| Color Tone (YI) | 2.2 | 2.2 | 0.9 | 0.9 | 0.9 | 4.7 |
| Light Transmission (%) | 90.7 | 90.7 | 90.1 | 90.1 | 90.1 | 90.4 |
| Heat Resistance HDT (°C.) | 130 | 131 | 130 | 130 | 131 | 110 |
| Heat Aging Resistance Color Tone (YI) | 36 | 35 | 12 | 11 | 11 | 55 |
| Water Resistance Haze | 1 | 1 | 4 | 4 | 4 | 72 |

| | Comp. 1 | Comp. 2 | Comp. 3 | Comp. 4 | Comp. 6 | Comp. 6 |
|---|---|---|---|---|---|---|
| Bisphenol A/Resorcin (mole ratio in feed) | 100/0 | 100/0 | 100/0 | 100/0 | 100/0 | 50/50 |
| Acidic Compound Added | Butyl p-toluene-sulfonate | Butyl p-toluene-sulfonate | — | Butyl p-toluene-sulfonate | — | Butyl p-toluene-sulfonate |
| (moles/mole alkali metal) | 2 | 2 | — | 2 | — | 2 |
| Epoxy Compound Celloxide 2021P (Daicel) (g/100 g polymer) | 0 | 0.05 | — | 0.05 | — | — |
| Additives (g/100 g polymer) | | | | | | |
| Irganox 168 (Ciba-Geigy) | 0 | 0.05 | — | 0.05 | — | — |
| Mark A0-50 (Adeki-Argus) | 0 | 0.05 | — | 0.05 | — | — |
| Cyasorb UV-5411 (Sun Chem) | 0 | 0.3 | — | 0.3 | — | — |
| TSF 437 (Toshiba Silicone) | 0 | 0.3 | — | 0.3 | — | — |
| Plast Violet 8840 (Bayer) | 0 | 0.00006 | — | 0.00006 | — | — |
| Initial Properties | | | | | | |
| Intrinsic Viscosity (dL/g) | 0.49 | 0.49 | 0.49 | 0.42 | 0.42 | 0.3 |
| MFR (g/10 min) | 10 | 11 | 11 | 27 | 27 | * |
| Color Tone (YI) | 1.8 | 0.6 | 0.5 | 0.6 | 0.6 | ** |
| Light Transmission (%) | 90.8 | 89.7 | 89.6 | 89.7 | 89.7 | ** |
| Haze | 0.3 | 0.3 | 0.4 | 0.3 | 0.3 | ** |
| Holdup Stability | | | | | | |
| MFR (g/10 min) | 11 | 13 | 17 | 31 | 34 | * |
| MFR Increase (%) | 5 | 15 | 55 | 15 | 25 | * |
| Color Tone (YI) | 2.2 | 0.9 | 1.1 | 0.9 | 1.2 | ** |
| Light Transmission (%) | 90.4 | 90.3 | 90.3 | 90.4 | 90.3 | ** |
| Heat Resistance HDT (°C.) | 135 | 135 | 135 | 132 | 132 | ** |
| Heat Aging Resistance Color Tone (YI) | 35 | 11 | 27 | 11 | 28 | ** |
| Water Resistance Haze | 0.8 | 4 | 70 | 4 | 80 | ** |

*(impossible to measure)
**(impossible to injection mold)

We claim:

1. An improved method for copolymerizing polycarbonate by melt polycondensing two or more aromatic dihydroxy compounds with from 1.0 to 1.3 moles of a carbonate diester per mole of aromatic-dihydroxy compound in the presence of a catalyst selected from the group consisting of alkali metal compounds and alkaline-earth metal compounds wherein the improvement comprises melt-polycondensing aromatic dihydroxy compounds wherein resorcin, substituted resorcins or mixtures thereof are 2– 90 mole % of the aromatic dihydroxy compounds at atmospheric pressure and at a temperature of from 80° C. to 250° C. for from 0 to 5 hours and then at a reduced pressure of less than 5 mm Hg and a temperature of from 240° C. to 320° C. and adding thereto an acidic compound whereby the copolymerized polycarbonate contains the residual catalyst but has a glass transition temperature in the range of from 100° C. to 150° C., a thermal decomposition temperature in the range of from 350° C. to 380° C. and a melt flow rate at a temperature of 280° C. and under a load of 1.2 kg of from 5 to 30 g/10 min.

2. The method of claim 1 wherein an epoxy compound is also added to the copolymerized polycarbonate.

3. An improved method for copolymerizing polycarbonate prepared by melt polycondensing two or more aromatic dihydroxy compounds with from 1.0 to 1.3 moles of a carbonate diester per mole of aromatic dihydroxy compound in the presence of a catalyst selected from the group consisting of alkali metal compounds and alkaline-earth metal compounds wherein the improvement comprises melt-polycondensing aromatic dihydroxy compounds wherein resorcin, substituted resorcins or mixtures thereof are 2–90 mole % of the aromatic dihydroxy compounds, at atmospheric pressure and at a temperature of from 80° C. to 250° C. for from 0 to 5 hours and then at reduced pressure of less than 5 mm Hg and a temperature of from 240° C. to 320° C., adding thereto an acidic compound and then vacuum treating the melted copolymerized polycarbonate whereby the copolymerized polycarbonate contains the residual catalyst but has a glass transition temperature in the range of from 100° C. to 150° C., a thermal decomposition temperature in the range of from 350° C. to 380° C. and a melt flow rate at a temperature of 280° C. and under a load of 1.2 kg of from 5 to 30 g/10 min.

4. The method of claim 3 wherein an epoxy compound is also added to the copolymerized polycarbonate before vacuum treatment.

5. A method of producing a copolymerized polycarbonate comprising melt polycondensing two or more aromatic dihydroxy compounds, from 2 to 90 mole % of which are resorcin or substituted resorcins, with from 1.0 to 1.3 moles of a carbonate diester per mole of aromatic dihydroxy compound in the presence of an alkali metal or an alkaline-earth metal catalyst at atmospheric pressure and at a temperature of from 80° C. to 250° C. for from 0 to 5 hours and then at a reduced pressure of less than 5 mm Hg and a temperature of from 240° C. to 320° C., and adding to the melt polycondensation product an acidic compound in an amount sufficient to neutralize the effect of any residue from the alkali metal or alkaline-earth metal catalyst on the copolymerized polycarbonate.

6. A method of claim 5 which further comprises vacuum treating the melt polycondensation product at a pressure of from 0.05 to 750 mm Hg at a temperature of from 240° to 350° C. after addition of the acidic compound.

7. A method of claim 5 wherein the catalyst further comprises from $1\times10^{-6}$ to $1\times10^{-1}$ moles of a nitrogen-containing basic compound per mole of aromatic hydroxy compound or from $1\times10^{-6}$ to $1\times10^{-1}$ moles of boric acid or a borate ester per mole of aromatic dihydroxy compound.

8. A method of claim 7 wherein the catalyst further comprises both the nitrogen-containing basic compound and boric acid or a borate ester.

* * * * *